United States Patent [19]

Beukema

[11] Patent Number: 5,081,624
[45] Date of Patent: Jan. 14, 1992

[54] FAULT-TOLERANT SERIAL ATTACHMENT OF REMOTE HIGH-SPEED I/O BUSSES

[75] Inventor: Bruce L. Beukema, Hayfield, Minn.

[73] Assignee: International Business Machines Corporation, Armonk, N.Y.

[21] Appl. No.: 458,867

[22] Filed: Dec. 29, 1989

[51] Int. Cl.⁵ .............................................. G06F 11/00
[52] U.S. Cl. ................................. 371/8.2; 371/11.2; 370/16.1
[58] Field of Search ............... 371/8.2, 11.2, 20.1, 371/20.6; 370/16.1, 16; 340/825.01, 827; 455/8; 364/200, 900

[56] References Cited

U.S. PATENT DOCUMENTS

| | | | |
|---|---|---|---|
| 3,652,798 | 3/1972 | McNeilly | 370/16.1 |
| 4,159,470 | 6/1979 | Strojny | 371/8.2 |
| 4,370,744 | 1/1983 | Hirano | 370/85.12 |
| 4,527,270 | 7/1985 | Sweeton | 371/11 |
| 4,539,655 | 9/1985 | Trussell | 340/825.01 X |
| 4,542,496 | 9/1985 | Takeyama | 370/16.1 X |
| 4,637,011 | 1/1987 | Crabbe, Jr. | 370/24 |
| 4,649,384 | 3/1987 | Sheafor et al. | 340/825.03 |
| 4,696,001 | 9/1987 | Gagliardi et al. | 370/88 |
| 4,835,763 | 5/1989 | Lau | 370/16 |
| 4,837,856 | 6/1989 | Glista, Jr. | 455/601 |
| 4,847,837 | 7/1989 | Morales | 371/8.2 |
| 4,939,730 | 7/1990 | Tarver | 371/11.2 |

Primary Examiner—Robert W. Beausoliel
Attorney, Agent, or Firm—Frederick W. Niebuhr; J. Michael Anglin

[57] ABSTRACT

A redundant, fault-tolerant connection is provided from a local processing station to a plurality of remote processing stations, each including an I/O bus and an associated I/O bus interface logic circuit. Two of the bus interface logic circuits are connected directly to the processor interface circuit, via separate direct links. Intermediate bus interface circuits of and I/O busses of intermediate remote stations are connected between the two selected bus interface circuits, in a series arrangement including alternate link segments and bus interface circuits. Each of the bus interface circuits has pass-through capability for transmitting data in either direction, and the links and link sections also are bidirectional, enabling transmission of data in either direction and on either path between the processor interface circuit and any of the remote stations, through any intervening stations. The processor interface circuit itself is intentionally configured without such pass-through capability.

14 Claims, 2 Drawing Sheets

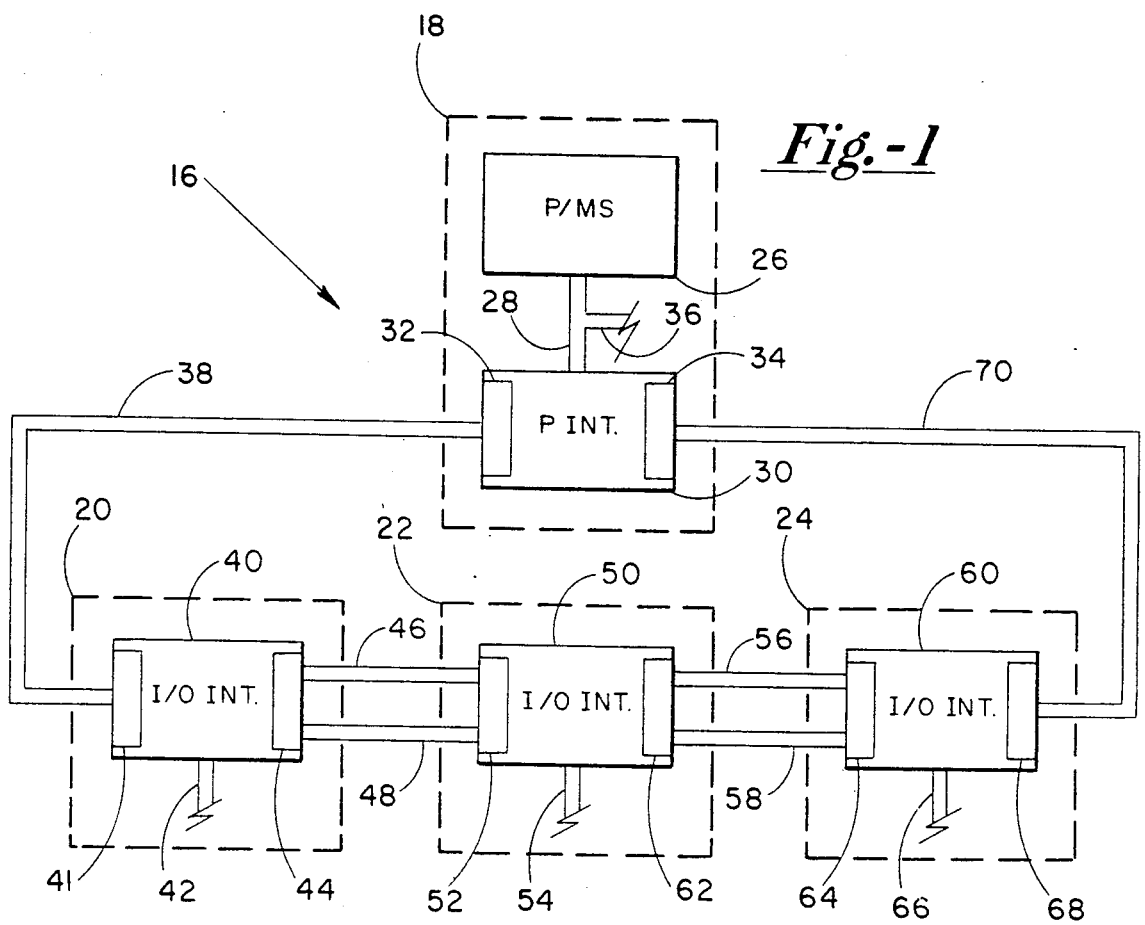
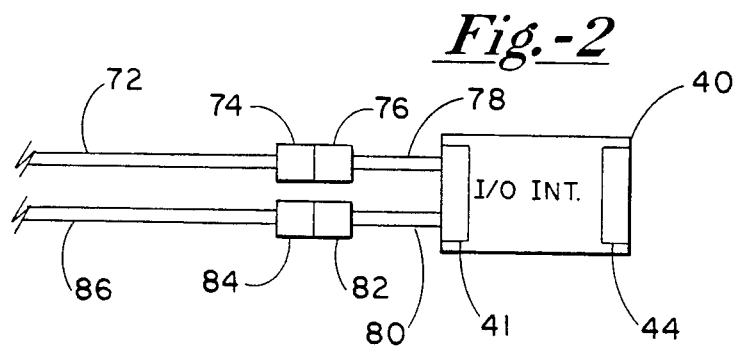

FAULT-TOLERANT SERIAL ATTACHMENT OF REMOTE HIGH-SPEED I/O BUSSES

BACKGROUND OF THE INVENTION

The present invention relates to information processing networks, and more particularly to fault-tolerant means for transmitting data between a local station and one or more remote data handling stations of an information processing network.

For numerous data processing applications, it is advantageous to utilize a network with more than one processing location, and further with one or more of the processing stations physically remote from a central or "local" processing station. Linkages for serial transmission of data are readily available for linking remote I/O busses to the local processing station. However, because such links usually involve conversion of data to a form more suitable to long distance transmission, an increased number of components is required for the linkage, dramatically increasing the probability of a failure among the components comprising the linkage. This is true particularly when the linkage includes a fiberoptic line and the accompanying necessary transmitter-receiver devices for converting bit-encoded data into optical signals, as well as the reverse conversion.

A known technique in this situation is to provide one or more redundant paths, available for transmitting data in the event of a failure along the original path. Among the known approaches are dual-ring arrangements, for example as disclosed in U.S. Pat. No. 4,837,856 (Glista, Jr.). Glista discloses a fault-tolerant fiberoptic coupler/receiver in a terminal in a high-speed digital, audio or video data transmission system. Each terminal has one or more bypass lines, and is connected to at least one bypass line from an upstream terminal. Logic on the terminal selects an input from either the primary line or one of the received bypass lines, based on predetermined values. A pair of rings is disclosed, both of which carry data unidirectionally and in the same direction.

U.S. Pat. No. 4,835,763 (Lau) shows a dual-ring network in which the unidirectional rings transmit data in opposite directions. Each of a plurality of nodes in the network selects one of the rings from which to receive data, based upon error signals. Each node can insert error signals to all downstream traffic, based on an error detected upstream. U.S. Pat. No. 4,696,001 (Gagliardi et al) and U.S. Pat. No. 4,527,270 (Sweeton) also disclose dual-ring arrangements in which signals travel in opposite directions.

Another apparatus for fault-tolerant serial transmission is disclosed in U.S. Pat. No. 4,649,384 (Sheafor et al). Sheafor et al describes a system including communication circuits connected to a host CPU (central processing unit), local controllers, and a plurality of memory discs, in which multiple four-wire circuits transmit data in bit-serial format. Some of the circuits are dedicated to data block transmission at a first transfer rate, and others are used only for message transmission at a second transfer rate.

The devices described in the foregoing patents, while satisfactory in certain respects, fail to adequately address certain requirements of the network employed in connection with the present invention. In addition to the need for redundancy, a need for numerous I/O busses meant that attachment of the busses with point-to-point serial links would have created electrical loading and circuit card real estate problems at the processor interface due to the large number of I/O bus interface chips and accompanying optical components. Further, due to the need for further module and card I/O pins, more cards would have been required to contain the processor interface logic, with the addition of further cards being unacceptable in view of certain structural features of the system.

Therefore, it is an object of the present invention to provide a network in which a minimum number of components is required to attach remote I/O busses to processor interface logic at a local station, while at the same time providing at least one redundant path for data transmission.

Another object is to provide an information processing network in which remote busses are connected to a local processing configuration in a manner to reduce electrical loading at the processor interface.

SUMMARY OF THE INVENTION

To achieve these and other objects, there is provided a data processing and transmission network with fault-tolerant attachment of a plurality of remote I/O busses to a local processing station. The network includes a local station including a processing device configuration, a main storage memory associated with the processing device configuration, and a processor interface logic circuit, also associated with the processing device configuration. A plurality of remote stations are provided, each remote station including an I/O bus and an I/O bus interface logic circuit associated with the I/O bus. A first path for serial and bidirectional transmission of data between the local station and the remote stations includes a first direct link connected to the processor interface logic circuit and to a first I/O bus interface logic circuit associated with a first one of the remote stations. This link permits direct transmission of data between the processor interface circuit and bus interface circuit. The first path further includes a first indirect linking means between the first bus interface circuit and a second I/O bus interface logic circuit associated with a second remote station. The first bus interface circuit has pass-through capability, for allowing passage of data through the first bus interface circuit when such data is transmitted between the processor interface circuit and the second bus interface circuit.

The network further includes a second, redundant path for serial and bidirectional transmission of data between the local station and the remote stations. The second path includes a second direct link connected to the processor interface circuit and to a selected one of the first and second I/O bus interface logic circuits. The selected bus interface logic circuit has the pass-through capability, for passage of data through the selected bus interface circuit when such data is being transmitted between the processor interface circuit and the other of the first and second bus interface circuits. The processor interface logic circuit is configured to prevent the transmission of the data therethrough, i.e. it lacks the pass-through capability.

Preferably, redundancy is enhanced by a second indirect linking means between the first and second bus interface circuits, with the second bus interface circuit being the selected circuit and thus receiving the second link directly from the processor interface circuit.

The network further can include one or more intermediate stations, each including an intermediate I/O bus and associated intermediate I/O bus interface logic circuit having the data pass-through capability. Then, the first indirect linking means includes each of the intermediate bus interface circuits and a plurality of first link segments. The link segments, together with all of the bus interface circuits, are connected in an alternating sequence with each of the intermediate bus interface circuits being between the first and second bus interface circuits. Similarly, the second indirect linking means includes the intermediate bus interface circuits and a plurality of second link segments, with all bus interface circuits and the second link segments connected in an alternating sequence, again with intermediate bus interface circuits between the first and second bus interface circuits.

This results in a horseshoe arrangement in which data from the processor interface logic circuit can be transmitted in either of two opposite directions, from opposite parts of the processor interface circuit, to a selected one of the I/O bus interface circuits, typically with a preference for the shortest transmission path or the path involving the minimum instances of data passing through the other bus interface circuits on its way to the destination interface circuit. Transmission back to the processors likewise occurs on the preferred path. At the same time, should any fault occur in the preferred path, the alternative path is selected and normal data processing operations are resumed.

Two or more remote stations can be provided in a single remote power domain, in which case the link segments between these stations need not be adapted for long distance transmission. Thus, the direct links of such system might be fiberoptic lines, while the link segments are formed of coaxial cable, printed axial cable, ribbon cable, or the like. The direct links similarly may be formed of coaxial cable, etc., although fiberoptic lines are preferred.

Thus, in accordance with the present invention, a reliable, fault-tolerant means of data transmission is provided by a redundant path which does not require an undue number of components, I/O pins or electrical loading at the processor interface.

IN THE DRAWINGS

For a further understanding of the above and other features and advantages, reference is made to the following description and to the drawings, in which:

FIG. 1 is a schematic illustration of an information processing network including a local processing station and a plurality of remote stations connected in accordance with the present invention;

FIG. 2 is a more detailed schematic view of a connection to I/O bus interface logic circuitry at one of the remote stations;

DETAILED DESCRIPTION OF THE PREFERRED EMBODIMENTS

Figure 3:
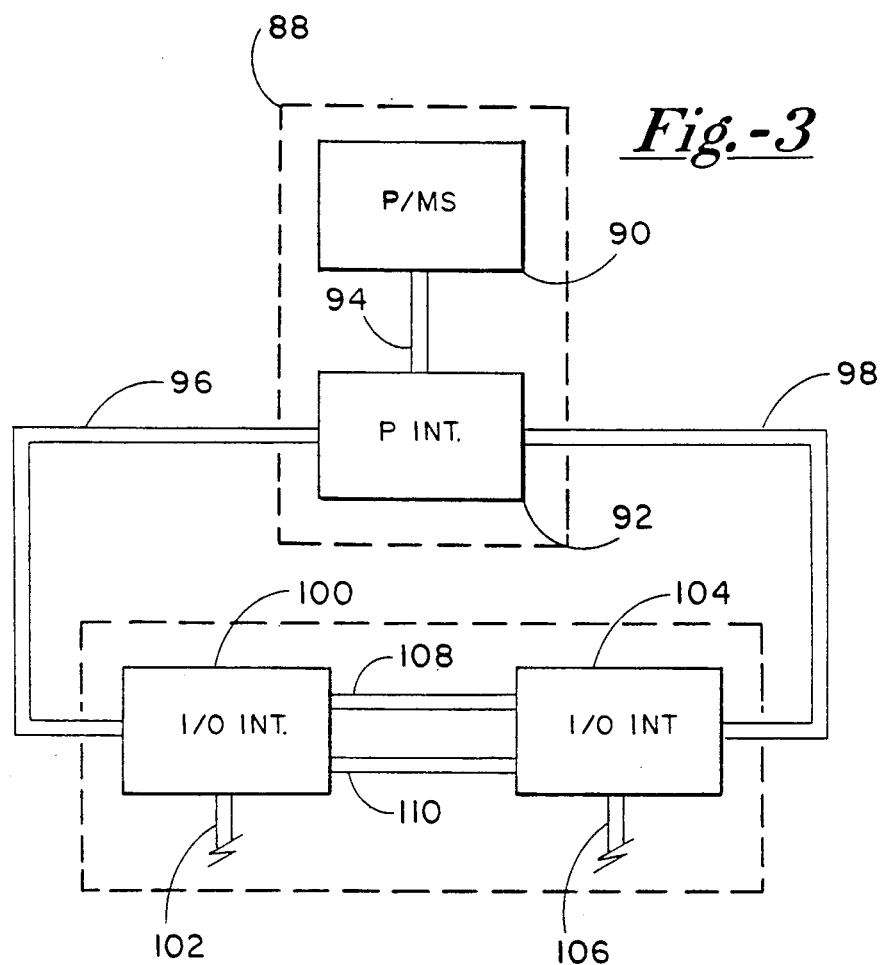
FIG. 3 shows an alternative embodiment network configured according to the present invention.

Turning now to the drawings, there is shown in FIG. 1 an information processing network 16 including a local information processing station 18 and a plurality of remote information processing stations 20, 22 and 24, each within its own individual power domain as indicated by the broken lines associated with each station. Local processing station 18 includes a processor and main storage configuration 26, which for example, can include multiple processing devices and multiple memory cards comprising main storage, linked to one another by a shared interface. A bus 28 associates processing configuration 26 with a processor interface logic circuit 30 having a first set of I/O ports 32 and a second and opposite set of I/O ports 34.

A branch 36 of bus 28 is available for connection to additional processor interface logic circuits, to join the processor configuration to further remote stations if desired.

A direct link 38, connected to I/O ports 32, is provided for serial, bidirectional transmission of information between processor interface circuit 30 and remote station 20, and more particularly with an I/O bus interface logic circuit 40 of the remote station, at I/O ports 41. Station 20 further includes an I/O bus 42, for associating logic circuit 40, and therefore any information received into circuit 40, with a disc drive or other processing device connected to the I/O bus.

Bus interface circuit 40 further includes I/O ports 44 for connection to a pair of bidirectional, serial data link segments 46 and 48 between circuit 40 and an I/O bus interface logic circuit 50 of remote station 22, specifically connected to I/O ports 52 of circuit 50. An I/O bus 54 is connected to bus interface circuit 50, and also can be connected to a processing device (not shown).

A pair of further bidirectional, serial link segments 56 and 58 are provided between bus interface circuit 50 and a bus interface circuit 60 of station 24, connected to I/O ports 62 and 64 of circuits 50 and 60, respectively. An I/O bus 66 is connected to interface logic circuit 60.

Bus interface circuit 60 further includes I/O ports 68 connected to a direct link 70, the other end of which is joined to I/O ports 34 of the processor interface circuit.

Each of bus interface circuits 40, 50 and 60 has pass-through capability, i.e. permits data to pass through on its way in either direction between processor interface circuit 30 and one of the other bus interface circuits. Accordingly, the direct links, link segments and bus interface logic circuits combine to provide two alternative paths for transmitting data between processor interface logic circuit 30 and any one of the bus interface logic circuits: a first path including direct link 38 and segments 46 and 56; and a second path including direct link 70 and link segments 48 and 58. In connection with FIG. 1, it is to be understood that network 16 might include further remote stations between stations 22 and 24 having bus interface logic circuits with pass-through capability, with further link segments provided, for an alternating arrangement or connection of link segments and remote stations as part of each of the alternative transmission paths. Processor interface circuit 30 has no such pass-through capability. The primary advantage in configuring the processor logic circuit to lack pass-through capability is that it eliminates the need for "cleanup" activity associated with conventional ring arrangements, as data always is dumped out at the local processing station.

Network 16 can involve long distances between local processing station 18 and the remote stations, as well as long distances from one of the remote stations to the next. Accordingly, links 38 and 70, as well as the link segments, preferably include fiberoptic lines, each such line being either a single fiber or a bundle of multiple fibers. Fiber optic lines are well suited for long distance transmissions, as they are virtually immune to interference from outside sources. The need for redundancy under these circumstances is perhaps best understood in connection with FIG. 2, illustrating the interconnection of a fiberoptic line of direct link 38, and I/O ports 44 of bus interface circuit 40. The fiberoptic line includes an optical fiber 72 providing data from local station 18 to an optical receiving device 74 which converts incoming optical data into bit-encoded data in serial form, in turn provided to a deserializer 76 which converts the data to parallel data, provided to ports 41 via a data bus 78.

For transmission of data from bus interface circuit 40 to local processing station 18, parallel data is provided via a bus 80 to a serializer 82, with serial data converted to optical data in an optical transmitter 84, which can be a light-emitting diode or laser transmitter. The transmitter provides light pulses to an optical fiber 86. It is noted that if desired, optical fibers 72 and 86 can be merged at a junction (not shown), with a single fiberoptic cable proceeding from the junction to processor interface logic circuit 30, to be split again into two separate optical pathways. Substantially similar apparatus is provided for conversion of optical data to parallel data at the processor interface circuit and the other bus interface circuits, the components of which are known in the art and not discussed in further detail.

Further in accordance with the present invention, two or more remote stations can reside within a single power domain. FIG. 3 shows a local processing station 88 including a processor and main storage configuration 90 connected to a processor interface logic circuit 92 via a bus 94, with direct serial links 96 and 98 joining the processor interface circuit and a single power domain including two remote stations, one including an I/O bus interface logic circuit 100 and an I/O bus 102, and the other including an I/O bus interface logic circuit 104 and accompanying I/O bus 106. Link segments 108 and 110 join the bus interface logic circuits. This network is configured in a similar manner as network 16, with a primary difference being that link segments 108 and 110 are relatively short and can be constructed of coaxial cable, twin axial cable, ribbon cable, or the like in lieu of optical fiber lines.

Figure 4:
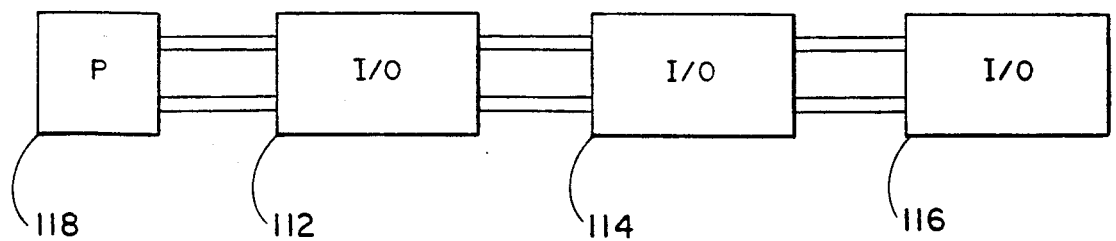
FIG. 4 shows another alternative embodiment network.

FIG. 4 shows a network in which multiple remote stations 112, 114 and 116 are connected in series to a local processing station 118 in the manner previously described, except that the alternative, bidirectional serial data paths are side-by-side. Generally the arrangements in FIGS. 1 and 3 are preferred, as they permit the option of selecting the more favorable transmission direction for a particular remote station, i.e. the shorter path or the path requiring the least amount of pass-through, so long as both transmission paths are functioning.

In connection with all networks, the primary advantage of the invention is that it permits identification of a failure along one of the paths, switching to the alternative path responsive to identification of a fault along one of the paths, and continued normal operation using only the redundant path, normally for a time sufficient to allow repair of the path in which a failure was detected. Failure detection proceeds in accordance with a protocol requiring an acknowledgement in response to a command, e.g. an acknowledgement from one of the remote stations in response to a command from the local station processing configuration. If the required acknowledgement is not received after a predetermined number of repeated attempts to send the command, the failure condition is identified and the command is issued over the alternative, redundant path. Error detecting means, known and not directly germane to the present invention, may be employed to detect failure in one of the paths, and clocking information and error code correction information in transmitted data may be used in an attempt to determine the nature and location of the failure. In any event, the redundant path is completely independent of the original path and permits normal data processing operations to continue until the original pathway is restored or replaced.

What is claimed is:

1. A data processing and transmission network with fault tolerant attachment of a plurality of remote I/O busses to a local processing station, said network including:

a local station including a processing device configuration, a main storage memory associated with the processing device configuration, and a processor interface logic circuit associated with the processing device configuration;

a plurality of remote stations, each remote station including an I/O bus and an I/O bus interface logic circuit associated with the I/O bus;

a first path for a serial and bidirectional transmission of data between the local station and the remote stations, including a first direct link connected to the processor interface logic circuit and to a first I/O bus interface circuit associated with a first one of said remote stations, for direct transmission of data between the processor interface circuit and the first bus interface circuit, and a first indirect linking means between the first bus interface circuit and a second I/O bus interface logic circuit associated with a second remote station; said first bus interface circuit having pass-through capability for passage of data, when transmitted between the processor interface circuit and the second bus interface circuit, and through the first bus interface circuit; and a second, redundant path for a serial and bidirectional transmission of data between the local station and the remote stations, including a second direct link connected to the processor interface circuit and to a selected one of the first and second I/O bus interface logic circuits; said selected bus interface logic circuit having said pass-through capability, for passage of data through the selected bus interface circuit when the data is transmitted between the processor interface circuit and the other of said first and second bus interface circuits; and wherein the processor interface logic circuit is configured to prevent the transmission of the data therethrough.

2. The network of claim 1 further including:
a second indirect linking means between the first and second bus interface circuits.

3. The network of claim 2 wherein:
said selected bus interface circuit is the second bus interface circuit.

4. The network of claim 3 wherein:
said first and second stations are part of a single power domain remote from the local station.

5. The network of claim 4 wherein:
said first and second direct links include respective first and second fiber-optic lines, and optical transmitting/receiving devices at opposite ends of said lines for converting electronic data into optical data.

6. The network of claim 5 wherein:

said processor interface logic circuit and said I/O bus interface logic circuits manipulate bit-encoded data in parallel, and wherein the first and second direct links further comprise serial/parallel converters at the opposite ends of each of the first and second fiber-optic lines.

7. The network of claim 5 wherein:
said first and second indirect linking means comprises one of the following: coaxial cable, twin axial cable or ribbon cable.

8. The network of claim 4 wherein:
each of said first and second direct links means comprises one of the following: coaxial cable, twin axial cable or ribbon cable.

9. The network of claim 2 further including:
at least one intermediate station, each intermediate station including an intermediate I/O bus and an associated intermediate I/O bus interface logic circuit having said pass-through capability, wherein said first indirect linking means includes said at least one intermediate I/O bus interface logic circuit and a plurality of first link segments, wherein all of the I/O bus interface logic circuits and the first link segments are connected in an alternating sequence with the at least one intermediate bus interface circuit being between the first and second I/O bus interface logic circuits.

10. The network of claim 9 wherein:
said second indirect linking means includes said at least one intermediate I/O bus interface logic circuit and a plurality of second link segments, the second link segments and all of the I/O bus interface logic circuits being connected in an alternating sequence with said at least one intermediate bus interface circuit connected between the first and second I/O bus interface logic circuits.

11. The network of claim 10 wherein:
said selected I/O bus interface logic circuit is the first bus interface circuit.

12. A data processing and transmission network with fault tolerant attachment of a plurality of remote I/O busses to a local processing station, said network including:
a local station including a processing device configuration, a main storage memory associated with the processing device configuration, and a processor interface logic circuit associated with the processing device configuration;
a plurality of remote stations, each remote station including an I/O bus and an I/O bus interface logic circuit associated with the I/O bus;
a first path for a serial and bidirectional transmissions of data between the local station and the remote stations, including a first direct link connected to the processor interface logic circuit and to a first I/O bus interface circuit associated with a first one of said remote stations, for direct transmission of data between the processor interface circuit and the first bus interface circuit, and a first indirect linking means between the first bus interface circuit and a second I/O bus interface logic circuit associated with a second remote station; said first bus interface circuit having pass-through capability for passage of data, when transmitted between the processor interface circuit and the second bus interface circuit, and through the first bus interface circuit; and a second, redundant path for a serial and bidirectional transmission of data between the local station and the remote stations, including a second direct link connected to the processor interface circuit and to a selected one of the first and second I/O bus interface logic circuits; said selected bus interface logic circuit having said pass-through capability, for passage of data through the selected bus interface circuit when the data is transmitted between the processor interface circuit and the other of said first and second bus interface circuits; and
wherein the processor interface logic circuit is configured to prevent the transmission of the data therethrough, and wherein the first and second stations are part of a single power domain remote from the local station.

13. A data processing and transmission network with fault tolerant attachment of a plurality of remote I/O busses to a local processing station, said network including:
a local station including a processing device configuration, a main storage memory associated with the processing device configuration, and a processor interface logic circuit associated with the processing device configuration;
a plurality of remote stations, each remote station including an I/O bus and an I/O bus interface logic circuit associated with the I/O bus;
a first path for a serial and bidirectional transmission of data between the local station and the remote stations, including a first direct link connected to the processor interface logic circuit and to a first I/O bus interface circuit associated with a first one of said remote stations, for direct transmission of data between the processor interface circuit and the first bus interface circuit, and a first indirect linking means between the first bus interface circuit and a second I/O bus interface logic circuit associated with a second remote station; said first bus interface circuit having pass-through capability for passage of data, when transmitted between the processor interface circuit and the second bus interface circuit, and through the first bus interface circuit;
a second, redundant path for a serial and bidirectional transmission of data between the local station and the remote stations, including a second direct link connected to the processor interface circuit and to a selected one of the first and second I/O bus interface logic circuits; said selected bus interface logic circuit having said pass-through capability, for passage of data through the selected bus interface circuit when data is transmitted between the processor interface circuit and the other of said first and second bus interface circuits; and
at least on intermediate station, each intermediate station including an intermediate I/O bus and an associated intermediate I/O bus interface logic circuit having said pass-through capability, wherein said first indirect linking means includes said at least one intermediate I/O bus interface logic circuit and a plurality of first link segments, wherein all of the I/O bus interface logic circuits and the first link segments are connected in an alternating sequence with the at least one intermediate bus interface circuit being between the first and second I/O bus interface logic circuits.

14. The network of claim 13 further including:

a second indirect linking means between the first and second bus interface circuits, including said at least one intermediate I/O bus interface logic circuit and a plurality of second link segments, the second link segments and all of the I/O bus interface logic circuits being connected in an alternating sequence with said at least one intermediate bus interface circuit connected between the first and second I/O bus interface logic circuits.

* * * * *